United States Patent Office 2,714,609
Patented Aug. 2, 1955

2,714,609

POLYETHOXY ESTERS OF N-SUBSTITUTED p-AMINOBENZOIC ACIDS

Max Matter, Worb, near Bern, Switzerland, assignor to Ciba Pharmaceutical Products, Inc., Summit, N. J.

No Drawing. Application July 2, 1954, Serial No. 441,157

Claims priority, application Switzerland February 15, 1950

6 Claims. (Cl. 260—471)

This application is a continuation-in-part of my copending application Serial No. 380,337 filed September 15, 1953, which itself is a continuation-in-part of my copending application Serial No. 210,796 filed February 13, 1951.

Esters of high molecular fatty acids and polyethylene glycols or polyethylene glycol monoalkyl ethers are known; these compounds possess surface-active properties and are used as wetting agents, detergents and emulsifiers.

From experiments made by the applicant it became clear that certain groups of esters from isocyclic carboxylic acids and polyethylene glycols or polyethylene glycol monoethers have excellent pharmacological properties and that they can for instance be used as infiltration anesthetics, spasmolytics, analeptics and bacteriostatics. Such surprising effects are remarkable because, for instance for the preparation of spasmolytics, the simultaneous use of aminoalcohols or other nitrogen containing compounds was thought necessary.

The main object of my said copending applications is concerned with new compounds corresponding to the general formula $$R.O(CH_2.CH_2.O)_nCH_2.CH_2.O.X$$

wherein R means hydrogen or a hydrocarbon radical having at most 6 carbon atoms, $n$ means 4 to 50 inclusive and X means the radical of a carboxylic acid containing at least one isocyclic ring.

The present invention, as is manifest from the appended claims, relates more particularly to compounds of the above formula, wherein R stands for hydrogen or a saturated hydrocarbon radical having at most 6 carbon atoms and $n$ is an integer from 7 to 50, and X stands for a radical of the formula

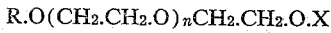

wherein R' represents a cycloalkyl or oxaalkyl radical having from 4 to 7 carbon atoms These new esters possess valuable pharmacological properties. More especially they show a local anesthetic effect. They are intended for use as medicaments, e. g. cough remedy, or as intermediates for the preparation of medicines.

Of especial value are the esters of the formula

wherein R represents hydrogen or advantageously an alkyl radical having 1 to 6 carbon atoms, such as ethyl, propyl, butyl, or hexyl, advantageously methyl, R' stands for a cycloalkyl- or oxaalkyl radical having from 4 to 7 carbon atoms, and $n$ is an integer from 7 to 14, advantageously 7 to 11.

The new esters are obtained by esterifying the said carboxylic acids or their functional derivatives with polyethylene glycols or with polyethylene glycol monoethers. The esterification can be carried out directly or the carboxylic acid can be esterified over the acid chloride or the acid anhydride, for instance according to Schotten-Baumann, or in the presence of pyridine. In some other instances it is more convenient to apply the re-esterification method.

The starting materials used are known or can be prepared by conventional methods. The polyethyleneglycols used have the formula

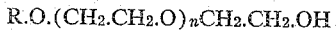

wherein $n$ stands for 4 to 50 inclusive and R stands for hydrogen or a saturated hydrocarbon radical having at most 6 carbon atoms.

If for instance R stands for isobutyl the polyethylene glycol derivative is obtained by reacting ethylene glycol monoisobutyl ether with $n$ moles of ethylene oxide in a pressure vessel at a temperature of 160° C. to 170° C. in the presence of a catalytic amount of potassium hydroxide.

The following examples serve to illustrate and explain the present invention without, however, being restrictive. The relationship of parts by weight to parts by volume is that of kilograms to liters.

Example 1

2.5 parts of para-hexylamino-benzoic acid ethyl ester are placed in a closed reaction vessel with 8 parts of octa-ethylene glycol monomethyl ether, the reaction vessel being provided with a regulatable inlet for solvent and with a connection for distilling in vacuo. In order to dry the mixture completely it is heated for one hour at 100–105° C. and absolute xylene is introduced under the surface of the mixture at a reduced pressure of 12 mm. of mercury. In this manner a continuous stream of xylene vapor passes through the whole apparatus and carries with it the last traces of moisture and other volatile impurities. The xylene is condensed in a condenser. The mixture is cooled to 20–30° C., and 0.06 part of sodium methylate dissolved in 0.6 part of methanol is added. Xylene is then passed through the apparatus again under reduced pressure at 100–105° C., whereby all of the methanol and the ethanol formed during the re-esterification are evaporated. The re-esterification is allowed to proceed under these conditions until a test portion of the reaction mass dissolves clearly in cold water, which is the case after about 2–3 hours. There is obtained in almost quantitative yield the ester of para-hexylamino-benzoic acid with octaethylene glycol monomethyl ether of the formula

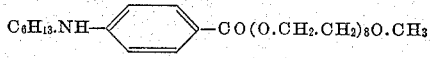

which still contains an excess of octaethylene glycol monomethyl ether. For the purpose of purification the product is dissolved in benzene and the benzene solution is washed several times with a solution of sodium carbonate of 5 per cent. strength. It is of advantage to extract all the aqueous washing solutions with fresh benzene. In this distribution between benzene and sodium carbonate solution the new ester remains in the benzene, and the excess of polyethylene glycol monomethyl ether and a small amount of brown impurities are taken up by the dilute sodium carbonate solution. By evaporating the dried and filtered benzene solution the new ester is obtained in the form of a colorless to quite pale yellow oil, which is easily soluble in most organic solvents, with the exception of aliphatic hydrocarbons. The new ester precipitates from an aqueous solution thereof of 10 per cent strength when heated at about 33° C. On cooling the ester easily re-dissolves.

The para-hexylamino-benzoic acid ethyl ester used as starting material may be prepared as follows:

8.3 parts of n-hexylbromide are stirred with 33 parts of para-amino-benzoic acid ethyl ester and a small quantity of copper powder for 12 hours at 130–140° C. and after cooling the mixture it is digested with 300 parts by volume of ether. After filtering the ethereal solution to remove insoluble matter, it is agitated several times with N-hydrochloric acid and evaporated. The residue crystallizes on cooling. There is obtained from the residue by recrystallization from a small quantity of ethanol and from a mixture of benzine and benzene (1:1) the colorless ester in a pure form melting at 89° C.

The octaethylene glycol monomethyl ether used as starting material may be prepared as follows:

35 parts of sodium are dissolved at 90–100° C. in portions in 500 parts by volume of triethylene glycol. At a bath temperature of 100–110° C. there are introduced dropwise in the course of 7 hours, while stirring energetically, 522 parts of pentaethylene glycol monomethyl ether-benzene sulfonate, and the whole is allowed to stand without stirring for 20 hours in an oil bath at 100–110° C. in an atmosphere of nitrogen.

After cooling the mixture, 300 parts by volume of water are added, and the whole is thoroughly extracted by agitation with 1 liter of chloroform. The aqueous layer is again extracted four times with 250 parts by volume of chloroform on each occasion. The chloroform extracts are extracted in succession twice with 150 parts by volume of water on each occasion. By drying and evaporating the chloroform extracts there are obtained 499 parts of a crude product, which is then well mixed with 100 parts by volume of ammonia of 25 per cent strength, and the whole is allowed to stand overnight and then heated for 4 hours at 100° C. The mixture is then evaporated under reduced pressure produced by a water jet pump and there are obtained 495.5 parts of a residue. The latter is diluted with 250 parts by volume of water and allowed to run through a column of a mixed bed of 100 parts by volume each of Amberlite JR 120 and JRA 410. The column is washed with 500 parts by volume of water and the elutriate is evaporated at 100° C. under 10 mm. pressure. There are obtained 487 parts of a residue.

484 parts of the crude product so obtained yield, upon distillation under a high vacuum, 10 parts of forerunnings, 70 parts of a distillation residue which solidifies, and 400 parts of octaethylene glycol monomethyl ether boiling at 165° C. (210° C.) under 0.01 mm. pressure.

The pentaethylene glycol monomethyl ether benzene sulfonate used above may be prepared as follows:

530 parts of the benzene sulfonic acid ester of diethylene glycol monomethyl ether are run in the course of 4 hours at 100° C., and while stirring, into a solution of 50 parts of sodium in 800 parts by volume of triethylene glycol, and the reaction mixture is maintained at 100° C. overnight. After cooling the mixture, there are added 500 parts by volume of water and 100 parts by volume of chloroform and the whole is well agitated. The chloroform layer is again extracted twice with 250 parts by volume of water on each occasion, and then evaporated. There remain behind 220 parts of crude pentaethylene glycol monomethyl ether. By extracting 5 times the three water layers each with 500 parts by volume of chloroform, there are obtained a further 250 parts of crude pentaethylene glycol methyl ether. From the crude product there are obtained by distillation at 110° C. under a high vacuum of 0.01 mm. 400 parts of the pure ether in the form of a colorless oil.

50 parts of pentaethylene glycol monomethyl ether are dissolved in 100 parts by volume of benzene, and 35 parts by volume of benzene sulfochloride are added dropwise in the course of ½ hour, while stirring and cooling, at 20–30° C. At the same time 15 parts of pulverized sodium hydroxide are added in equal portions. The whole is further stirred for 2½ hours, and then allowed to stand overnight without stirring. The mixture is then filtered with suction to remove precipitated salts, and the filtrate is agitated with 20 parts by volume of an aqueous solution of ammonia of 25 per cent strength for 4 hours. Any benzene sulfochloride which is still present is converted in this manner into the alkali-soluble sulfonamide. The whole is mixed with 50 parts by volume of caustic soda solution of 10 per cent strength and agitated well. The aqueous layer is extracted once more with 150 parts by volume of benzene and the two benzene extracts are washed in succession with 50 parts by volume of caustic soda solution of 10 per cent strength and 50 parts by volume of water. By evaporating the dried benzene solution there are obtained 70 parts of the solvent-free benzene sulfonic acid ester of pentaethylene glycol monomethyl ether in the form of an almost colorless oil.

Instead of para-hexylamino-benzoic acid ethyl ester there may be used para-(3-methoxybutyl)-aminobenzoic acid methyl ester of the formula

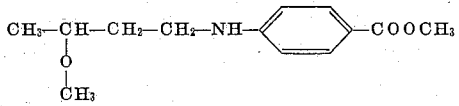

or para-(4-methoxybutyl)-aminobenzoic acid propyl ester of the formula

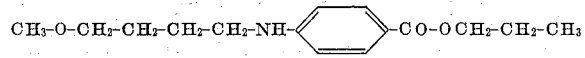

so that the corresponding esters of octaethylene glycol monomethyl ether are obtained which exhibit almost the same turbidity point.

*Example 2*

2.63 parts of para-heptylamino-benzoic acid ethyl ester are reacted with 8 parts of octaethylene glycol monomethyl ether as described in Example 1. In this manner there is obtained in almost quantitative yield the ester of para-heptylaminobenzoic acid with octaethylene glycol monomethyl ether of the formula

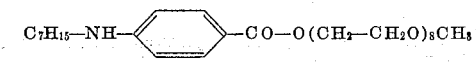

which still contains an excess of octaethylene glycol monomethyl ether. The product is purified in the manner described in Example 1. In this manner there is obtained the new ester in the form of a colorless to quite pale yellow oil, which is easily soluble in most organic solvents, with the exception of aliphatic hydrocarbons. The new ester is precipitated from an aqueous solution of 10 per cent. strength by heating it at about 32° C., but it easily redissolves on cooling.

The para-heptylamino-benzoic acid ethyl ester used as starting material may be prepared as follows:

18 parts of n-heptyl bromide and 50 parts of para-aminobenzoic acid ethyl ester are stirred in the presence of a small amount of copper powder in a flask provided with an ascending tube for 12 hours at 120–125° C., the mixture is then taken up in 250 parts by volume of ether, and the solution is filtered to remove insoluble matter and poured into a separating funnel. By repeated agitation with n-hydrochloric acid unreacted para-aminobenzoic acid ethyl ester is removed, and by evaporating the ethereal solution 26 parts of crude para-hexylaminobenzoic acid ethyl ester are obtained. The product may be purified by recrystallization from a mixture of ether and petroleum ether or from benzine. The pure ester boils at 122–124° C. under 12 mm. pressure of mercury and melts at 77° C.

The preparation of the octaethylene glycol monomethyl ether used as starting material is described in Example 1. By using decaethylene glycol monomethyl ether, instead of octaethylene glycol monomethyl ether, for the re-esterification of para-heptylamino benzoic acid ethyl ester there is obtained an ester which is still soluble in water at 40° C. and has similar properties.

Example 3

4.42 parts of para-butylaminobenzoic acid ethyl ester are reacted with 15.5 parts of octaethylene glycol monomethyl ether in the manner described in Example 1. In this manner there is obtained in almost quantitative yield the ester of para-butylaminobenzoic acid with octaethylene glycol monomethyl ether of the formula

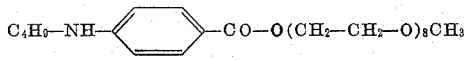

which still contains an excess of octaethylene glycol monomethyl ether. The product is purified in the manner described in Example 1. In this manner the new ester is obtained in the form of a colorless to quite pale yellow oil, which easily dissolves in most organic solvents, with the exception of aliphatic hydrocarbons. The new ester precipitates from an aqueous solution of 10 per cent strength when heated to about 38° C., but easily redissolves upon cooling.

The preparation of the octaethylene glycol monomethyl ether used as starting material is described in Example 1.

A similar water-soluble ester is obtained by using, instead of para-butylaminobenzoic acid ethyl ester, para-(secondary butyl)-aminobenzoic acid ethyl ester of the formula

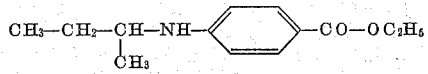

Example 4

4.42 parts of para-butylamino benzoic acid ethyl ester are reacted with 21 parts of undecaethylene glycol monomethyl ether in the manner described in Example 1. There is obtained in almost quantitative yield the ester of para-butylaminobenzoic acid with undecaethylene glycol monomethyl ether of the formula

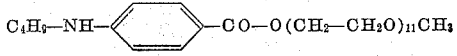

which still contains an excess of undecaethylene glycol monomethyl ether. The product is purified as described in Example 1, and in this manner the new ester is obtained in the form of a colorless to quite pale yellow oil, which is easily soluble in most organic solvents, with the exception of aliphatic hydrocarbons. The new ester precipitates from an aqueous solution of 10 per cent strength when heated to about 54° C., but it easily redissolves upon cooling.

The undecaethylene glycol monomethyl ether used as starting material may be prepared as follows:

100 parts by volume of triethylene glycol are heated in a stirring flask fitted with a dropping funnel and an internal thermometer at 95–100° C., and 4.8 parts of metallic sodium are added. After about ¾ hour all the sodium will have dissolved. 105 parts of octaethylene glycol monomethyl ether benzene sulfonate are then allowed to run in slowly and the whole is further stirred at 95–100° C. overnight. The mixture is rinsed with 100 parts by volume of water into a separating funnel, extracted in succession with 250 and twice with 125 parts by volume of chloroform, and these chloroform extracts are themselves extracted in succession twice with 50 parts by volume of water. The combined chloroform solutions, yield, after evaporation, 94.7 parts of undecaethylene glycol monomethyl ether, which distils at 220° C. under 0.01 mm. pressure in the form of a colorless oil and solidifies in the cold in crystalline form after prolonged standing.

The octaethylene glycol monomethyl ether benzene sulfonate used as starting material may be prepared as follows:

383 parts of octaethylene glycol monomethyl ether are dissolved in 500 parts by volume of benzene and mixed in the course of one hour at 20–30° C. simultaneously, while stirring, with 180 parts by volume of benzene sulfochloride and 100 parts of pulverized sodium hydroxide. The whole is stirred for a further 2 hours and is then allowed to stand without stirring overnight. The pH value is then substantially higher than 7. 600 parts by volume of water are stirred in, whereupon two layers are formed. The aqueous layer is extracted once with 200 parts by volume of benzene. The two combined benzene solutions are mixed with 50 parts by volume of ammonia solution of 25 per cent strength and agitated for 4 hours on the machine, and then agitated with a further 50 parts by volume of a 2N-solution of sodium hydroxide for a short time. The aqueous layer is again extracted with 200 parts by volume of benzene, and the two benzene layers are washed in succession with 50 parts by volume of a 2N-solution of caustic soda and 50 parts by volume of water. From the combined and dried benzene extracts there are obtained by evaporation in vacuo 473 parts of crude sulfo-ester.

There can be obtained from the aqueous extracts by a single extraction with 500 parts by volume of chloroform, 30 parts of octaethylene glycol monomethyl ether.

In the manner described in the case of undecaethylene glycol monomethyl ether, dodecaethylene glycol monomethyl ether can be reacted with para-butylaminobenzoic acid ethyl ester, whereby a very similar ester is obtained having only a slightly higher turbidity point.

Example 5

2.21 parts of para-butylaminobenzoic acid ethyl ester are reacted with 11.0 parts of octaethylene glycol in the manner described in Example 1. There is obtained in almost quantitative yield the ester of para-butylaminobenzoic acid with octaethylene glycol of the formula

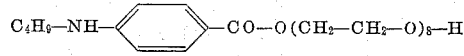

which still contains an excess of octaethylene glycol. The product is purified in the manner described in Example 1. The ester obtained by partition and evaporation of the benzene solution still contains diester as an impurity and the latter can be separated therefrom as follows:

4.75 parts of the crude ester (turbidity point about 42° C.) are dissolved in 20 parts by volume of ether and the ethereal solution is extracted three times with 50 parts by volume of water (which has been previously saturated with ether). The aqueous extracts are themselves extracted in succession twice with 20 parts by volume of ether on each occasion and twice with 50 parts by volume of benzene on each occasion. The diester is present in the ether. There can be obtained from the combined benzene solutions by evaporation and drying in a high vacuum 4 parts of the monoester in the form of a slightly yellowish oil, which is of unlimited solubility in ethanol, acetone and benzene, and in water only at temperatures below about 55° C.

The octaethylene glycol used as starting material may be prepared as follows:

200 parts by volume of diethylene glycol are dissolved in 1800 parts by volume of benzene and mixed, while stirring energetically and cooling, in the course of one hour at 30–35° C. simultaneously with 300 parts by volume of benzene sulfochloride and 400 parts of pulverized sodium hydroxide. The whole is stirred for a further 30 hours and then allowed to stand for one day. By stirring in 2500 parts by volume of water, the salt which crystallizes out and the excess of sodium hydroxide is dissolved, and the aqueous solution is extracted with 200 parts by volume of benzene. The purified benzene extract is mixed with 100 parts by volume of an aqueous ammonia solution of 25 per cent strength and agitated for 4 hours on the machine. Finally, the mixture is again agitated for a short time with 200 parts by volume of an aqueous solution of caustic soda of 10 per cent strength. The aqueous portions are separated, the benzene solution is washed with 100 parts by volume of caustic soda solution of 10 percent strength and then with 100 parts by volume of ether, and all the aqueous portions are extracted in succession with 200 parts by volume of benzene. By evaporating the combined and dried benzene extracts there are obtained 770 parts of crude ester in the form of a slightly brownish colored oil, which crystallizes from 10,000 parts by volume of methyl alcohol. There are obtained 735 parts of diethylene glycol dibenzene sulfonate melting at 35° C.

195 parts of the diester so obtained in 25 parts by volume of anhydrous ether are introduced dropwise in the course of 4 hours at 100–110° C., while stirring well and with the exclusion of moisture, into a solution of 26 parts of sodium in 400 parts by volume of triethylene glycol. The whole is stirred for a further 6 hours, and then allowed to stand for 10 hours at 100–110° C. without stirring. By exhaustive extraction with ether in an apparatus working in a continuous manner there are obtained 460 parts of an almost colorless oil, which is allowed to stand overnight with 100 parts by volume of ammonia solution of 25 per cent strength. The whole is then evaporated, taken up in 225 parts by volume of water and allowed to run through a column of a mixed bed of Amberlite IR 120 and IRA 410 in order to remove ionogenic constituents. By evaporating the elutriate under reduced pressure produced by a water jet pump there are obtained 446 parts of an almost colorless oil. By distillation under a high vacuum there are obtained, in addition to 315 parts of an excess of triethylene glycol, 100 parts of octaethylene glycol boiling at 175° C. under 0.01 mm. pressure in the form of a colorless oil and 30 parts of a residue which solidifies in a wax-like form.

*Example 6*

2.65 parts of para-(2-butoxyethyl-amino)-benzoic acid ethyl ester are reacted by the method described in Example 1 with 9 parts of polyethylene glycol monomethyl ether boiling at 200–220° C. under 0.01 mm. pressure. In this manner there is obtained in almost quantitative yield the ester of a polyethylene glycol monomethyl ether with para-(2-butoxyethylamino)-benzoic acid of the formula

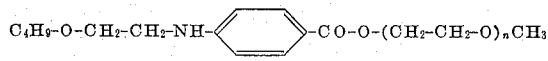

in which $n$ has the average value of 9–11 and which still contains an excess of polyethylene glycol monomethyl ether. Purification is carried out as described in Example 1. By evaporating the dried and filtered benzene solution the new ester is obtained in the form of a colorless to very slightly yellow oil, which easily dissolves in most organic solvents, with the exception of aliphatic hydrocarbons. The new ester precipitates from an aqueous solution of 10 per cent. strength when heated to about 44° C., but easily redissolves upon cooling.

The para-(2-butoxyethylamino)-benzoic acid ethyl ester used as starting material may be prepared in the following manner:

118 parts of ethylene glycol monobutyl ether in 450 parts by volume of benzene are slowly mixed at 20–30° C. simultaneously with 20 parts of pulverized sodium hydroxide and 45 parts by volume of benzene sulfochloride. A further 135 parts by volume of benzene sulfochloride are slowly added simultaneously with 52 parts of pulverized sodium hydroxide. The whole is stirred for 2 hours and then allowed to stand overnight. It is then mixed with 450 parts by volume of water and the aqueous layer is separated. The latter is extracted with agitation with a further 100 parts by volume of fresh benzene. The combined benzene solutions are agitated with 50 parts by volume of concentrated ammonia solution for 4 hours, then mixed with 100 parts by volume of a 2N-solution of caustic soda and agitated for a further 10 minutes. The aqueous layer is separated, the benzene solution is washed with 100 parts by volume of a 2N-solution of caustic soda and then with 100 parts by volume of water. By evaporating the benzene solution and drying the residue at 100° C. in vacuo, there are obtained 249 parts of ethylene glycol monobutyl ether benzene sulfonate in the form of a pale yellow oil. 8.5 parts of the latter are stirred with 22 parts of para-aminobenzoic acid ethyl ester at 100–105° C. for 2 hours and then for 1½ hours at 115–120° C. A short time after the reaction temperature is attained, colorless crystals begin to separate out. After cooling the mixture, it is mixed with 100 parts by volume of ether, filtered to remove insoluble benzene sulfonate of para-aminobenzoic acid ethyl ester and the filtrate is washed with ether. The ethereal solution is washed 5 times with 50 parts by volume of N-hydrochloric acid on each occasion and once with 50 parts by volume of a 3N-solution of potassium hydrogen carbonate. By evaporating the dried ethereal solution there are obtained 8.24 parts of a red-brown oil, which distils at 140–142° C. under 0.01 mm. pressure of mercury in the form of a colorless oil. The latter consists of pure para-(2-butoxyethylamino)-benzoic acid ethyl ester.

*Example 7*

2.35 parts of para-isoamylamino-benzoic acid ethyl ester are reacted by the method described in Example 1 with 9 parts of polyethylene glycol monomethyl ether boiling at 200–220° C. under 0.01 mm. pressure. There is obtained in almost quantitative yield the ester of a polyethylene glycol monomethyl ether with para-isoamylaminobenzoic acid ethyl ester of the formula

in which $n$ has the average value of 9–11, and which still contains an excess of polyethylene glycol monomethyl ether. Purification is carried out as described in Example 1. By evaporating the dried and filtered benzene solution the new ester is obtained in the form of a colorless to very slightly yellow oil, which is easily soluble in most organic solvents with the exception of aliphatic hydrocarbons. The new ester precipitates from an aqueous solution of 10 per cent. strength when heated to about 43° C., but easily redissolves upon cooling.

The same ester can also be prepared as follows:

2.07 parts of para-isoamylaminobenzoic acid, 1.85 parts of benzene sulfonic acid (containing 1 mol of water of crystallization) and 7 parts of polyethylene glycol monomethyl ether boiling at 200–220° C. under 0.01 mm. pressure are heated for 3 hours at 140–150° C. while introducing a dry current of nitrogen. At the end of this period the esterification accompanied by the splitting off of water is practically finished. For the purpose of purification the reaction mass is distributed several times between benzene and a 2N-solution of sodium carbonate, the dried benzene solution is evaporated, and there is obtained as a residue the new ester in a yield of 5.9 parts.

*Example 8*

2 parts of para-cyclohexylamino-benzoic acid ethyl ester are reacted by the method described in Example 1 with 7 parts of polyethylene glycol monomethyl ether boiling at 200–220° C. under 0.01 mm. pressure. In this manner there is obtained in almost quantitative yield the ester of a polyethylene glycol monomethyl ether with para-cyclohexylamino-benzoic acid of the formula

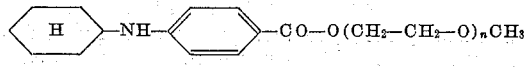

in which $n$ has the average value of 9–11, and which still contains an excess of polyethylene glycol monomethyl ether. Purification is carried out as described in Example 1. The new ester is obtained in the form of a colorless to very slightly yellow oil, which is easily soluble in most organic solvents, with the exception of aliphatic hydrocarbons. The new ester precipitates from an aqueous solution of 10 per cent strength when heated at about 43° C., but easily redissolves upon cooling.

The para-cyclohexylaminobenzoic acid ethyl ester used as starting material may be prepared in the following manner:

11.4 parts of bromocyclohexane and 46 parts of para-aminobenzoic acid ethyl ester are stirred for 14 hours at 120–130° C. and then for a further 3 hours at 140–150° C. The reaction mass, in which crystals will have separated, is digested with 400 parts by volume of ether. After filtering the solution, it is extracted 4 times with 250 parts by volume of N-hydrochloric acid and once with 250 parts by volume of a saturated solution of sodium hydrogen carbonate, and the aqueous solutions are washed with a further 300 parts by volume of ether. From the combined and dried ethereal solutions there are obtained by evaporation 5.1 parts of a dry residue. The pure para-cyclohexylaminobenzoic acid ethyl ester is obtained from the residue by distillation and recrystallization from a small amount of a mixture of ethanol and water (5:1). The product boils at 215–218° C. under 10 mm. pressure and melts at 57–58° C.

In a similar manner there can be obtained the para-cyclopentylaminobenzoic acid ester of a polyethylene glycol monomethyl ester, which when the chain of the polyglycol residue is of the same length has a somewhat higher turbidity point.

*Example 9*

2.21 parts of para-butylaminobenzoic acid ethyl ester are reacted 12.5 parts of nona-ethylene glycol by the method described in Example 1. There is obtained in almost quantitative yield the ester of para-butylamino benzoic acid with nona-ethylene glycol of the formula

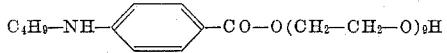

which still contains an excess of nona-ethylene glycol. The product is purified in the manner described in Example 1.

The separation of the diester is carried out as described in Example 5:

From 5.5 parts of the crude ester 4.8 parts of the pure ester are obtained in the form of a slightly yellowish oil, which is of unlimited solubility in methanol and toluene and also in water only at temperatures below 63° C.

The nona-ethylene glycol used as starting material may be prepared as follows:

The dibenzene sulfonic acid ester of triethylene glycol is first prepared by the method described in Example 5 for diethylene glycol. There are obtained from 280 parts by volume of triethylene glycol in 2000 parts by volume of benzene, 800 parts by volume of benzene sulfochloride and 400 parts of pulverized sodium hydroxide, 820 parts of the crude ester, which yields 665 parts of crystalline triethylene glycol dibenzene sulfonate melting at 38–39° C. by recrystallization from 10,000 parts by volume of methyl alcohol.

215 parts of the crystalline diester are reacted by the method described in Example 5 with a solution of 26 parts of sodium in 400 parts by volume of triethylene glycol, and the product is worked up in an analogous manner. The resulting 465 parts of crude product yield, upon distillation under a high vacum, 290 parts of regenerated triethylene glycol and 110 parts of nona-ethylene glycol boiling at 190° C. under 0.01 mm. pressure, in addition to 50 parts of a residue which solidifies in a wax-like form.

By the usual methods the new esters obtained according to the invention can be made up into pharmaceutical preparations for enteral or parenteral, especially oral administration. Such preparations contain the said esters in admixture with a suitable pharmaceutical organic or inorganic carrier material for enteral or parenteral, especially oral administration. For the production of these preparations such substances are concerned as do not react with the new compound. The pharmaceutical preparations can be made up, for example, into the form of syrups or in liquid form as solutions. If desired, they may be sterilized and/or may contain auxiliary substances such as preservative, stabilizing, wetting or emulsifying agents, or salts for the control of the osmotic pressure or buffer substances. They may also contain other therapeutically valuable substances or flavoring agents.

In the mentioned preparations the content of the esters may amount, for example, to 0.5 per cent by weight.

What is claimed is:

1. The new esters of the formula

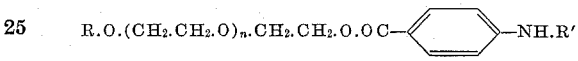

wherein $n$ means an integer from 7 to 50 inclusive, R stands for a member selected from the group consisting of hydrogen and saturated hydrocarbon radicals having at most 6 carbon atoms, R′ represents a member of the group consisting of cycloalkyl- and oxaalkyl radicals having from 4 to 7 carbon atoms.

2. The new esters of the formula

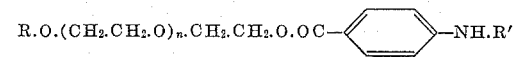

wherein $n$ is an integer from 7 to 14, R stands for an alkyl radical having at most 6 carbon atoms, and R′ for a cycloalkyl radical having from 4 to 7 carbon atoms.

3. The new esters of the formula

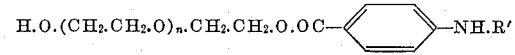

wherein $n$ is an integer from 7 to 14 and R′ stands for a cycloalkyl radical having from 4 to 7 carbon atoms.

4. The new esters of the formula

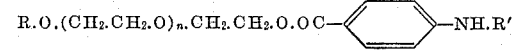

wherein $n$ is an integer from 7 to 14, R stands for an alkyl radical having at most 6 carbon atoms and R′ for an oxaalkyl radical having from 4 to 7 carbon atoms.

5. The new esters of the formula

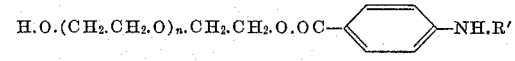

wherein $n$ is an integer from 7 to 14 and R′ stands for an oxaalkyl radical having from 4 to 7 carbon atoms.

6. The new ester of the formula

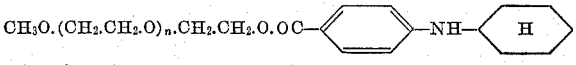

wherein $n$ has an average value of 8–10.

No references cited.